(12) United States Patent
Wang et al.

(10) Patent No.: US 12,098,073 B1
(45) Date of Patent: Sep. 24, 2024

(54) EXPERIMENTAL SIMULATION DEVICE FOR HYDROGEN PRODUCTION BY IN-SITU CONVERSION OF GAS RESERVOIR AND USE METHOD THEREOF

(71) Applicant: Southwest Petroleum University, Chengdu (CN)

(72) Inventors: Chaowen Wang, Chengdu (CN); Qunchao Ding, Chengdu (CN); Liehui Zhang, Chengdu (CN); Chunsheng Jia, Chengdu (CN); Xiaolong Peng, Chengdu (CN); Yulong Zhao, Chengdu (CN); Suyang Zhu, Chengdu (CN); Peng Deng, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 18/589,455

(22) Filed: Feb. 28, 2024

(30) Foreign Application Priority Data

Mar. 9, 2023 (CN) .......................... 202310220285.9

(51) Int. Cl.
*C01B 3/36* (2006.01)

(52) U.S. Cl.
CPC ........ *C01B 3/36* (2013.01); *C01B 2203/0872* (2013.01); *C01B 2203/1241* (2013.01); *C01B 2203/1258* (2013.01); *C01B 2203/1619* (2013.01); *C01B 2203/1633* (2013.01)

(58) Field of Classification Search
CPC .............. C01B 3/36; C01B 2203/1241; C01B 2203/0872
See application file for complete search history.

(56) References Cited

FOREIGN PATENT DOCUMENTS

| CN | 102374963 A | 3/2012 |
|---|---|---|
| CN | 102944666 A | 2/2013 |

*Primary Examiner* — Paul A Wartalowicz
(74) *Attorney, Agent, or Firm* — Andrew C. Cheng

(57) ABSTRACT

An experimental simulation device for hydrogen production by in-situ conversion of a gas reservoir comprises a gas source, a plurality of groups of reactors and an analysis monitoring device, wherein the gas source comprises a methane tank, a helium tank, an oxygen tank and a water vapor generator, the gas source can supply gas to the reactors separately, the in-situ hydrogen production is simulated in the reactors; and meanwhile, a use method of the experimental simulation device for hydrogen production by in-situ conversion of the gas reservoir can achieve accurate simulation of the multi-stage in-situ hydrogen production and multi-well group cooperative hydrogen production processes of different types of gas reservoirs in actual production by adjusting connection states of the plurality of groups of reactors. The experimental result in the present invention can be closer to the actual production.

8 Claims, 2 Drawing Sheets

EXPERIMENTAL SIMULATION DEVICE FOR HYDROGEN PRODUCTION BY IN-SITU CONVERSION OF GAS RESERVOIR AND USE METHOD THEREOF

BACKGROUND

1. Technical Field

The present invention relates to the technical field of oil and gas development, and in particular, to an experimental simulation device for hydrogen production by in-situ conversion of a gas reservoir and a use method thereof.

2. Description of Related Art

The main principle of in-situ hydrogen production in the oil and gas development process is to produce hydrogen with residual oil and gas in the formation, which generally uses various means to catalyze the cracking of oil and gas to produce hydrogen to achieve in-situ hydrogen production. The conventional research mode at present is to provide corresponding experimental equipment for the in-situ hydrogen production process to simulate the production process of the hydrogen in the formation, and a single core is mainly used to fill crude oil or methane for cracking hydrogen production; however, the in-situ hydrogen production in a single well group can only be simulated.

In the actual production process, the underground environment is often distributed in a combination of a plurality of well sections. For in-situ hydrogen production from gas reservoirs under shale formations, the shale gas is mined by the multi-stage fracturing horizontal well, and meanwhile, since the hydrogen production reaction is a reaction with increased volume, the pressure is increased due to the reaction; consequently, the reservoir state and the reaction condition of adjacent well sections are inevitably influenced when the hydrogen production process occurs, and the hydrogen production process between the adjacent well sections generates a synergistic effect or an influence. However, the conventional in-situ hydrogen production experimental equipment cannot meet the research on multi-well section combined in-situ hydrogen production at present.

For gas reservoirs under sandstone formations, the porosity of rock formations is larger than that of shale formations, the mobility between the adjacent gas reservoirs is better, and gas in the adjacent regions can be supplemented to the hydrogen production regions where the production wells are located in a displacement mode in the production process of in-situ hydrogen production, so that the production cost of hydrogen production can be reduced. It can be seen that simulation research on this process is of great significance. However, there is no research on this aspect in the use of common in-situ hydrogen production experimental equipment.

SUMMARY

In view of this, the present invention aims to provide an experimental simulation device for hydrogen production by in-situ conversion of a gas reservoir and a use method thereof, which can simulate in-situ hydrogen production between adjacent fracturing stages in a fractured horizontal well and gas source supplement by gas well displacement during multi-well cooperative hydrogen production, thus providing effective experimental support for researching the in-situ hydrogen production from the gas reservoirs under different conditions.

To solve at least one of the above technical problems, the present invention provides a technical solution as follows.

Provided is an experimental simulation device for hydrogen production by in-situ conversion of a gas reservoir, comprising: a gas source, reactors and an analysis monitoring device, wherein the gas source comprises a methane tank, a helium tank, an oxygen tank and a water vapor generator, the methane tank, the helium tank, the oxygen tank and the water vapor generator are separately connected into a plurality of groups of reactors, and a displacement pump, a flow stabilizing valve, a one-way valve and a heater are sequentially arranged on a connecting pipeline between the gas source and the reactor;

the reactor comprises a main reaction chamber and a pre-reaction chamber, wherein the main reaction chamber is a sealed cavity structure positioned inside the reactor, the pre-reaction chamber is a detachable cavity arranged inside the reactor, and the main reaction chamber and the pre-reaction chamber are connected through a relay connector; the reactor is provided with an inlet connector for connecting a gas source pipeline, the inlet connector can be connected into the pre-reaction chamber, and the reactor is further provided with an outlet connector connected to the main reaction chamber for discharging gas; the main reaction chamber of the reactor is provided with at least two groups of communicating pipe connectors and a group of confining pressure connectors connected to an external confining pressure device;

the adjacent reactors are also connected by an interaction pipeline, and the interaction pipeline is provided with a communicating valve that is connected to a communicating pipe connector of the adjacent reactors; and the analysis monitoring device is connected to the outlet connector of each group of reactors, and can also be used to perform real-time online monitoring on the temperature and pressure of the reactors.

According to an embodiment of the present invention, at least one group of inlet flow valves are provided on pipelines of each group of reactors connected to the gas source, the inlet flow valves can control the methane tank, the helium tank, the oxygen tank and the water vapor generator separately to input gas into the reactors, and the pipelines of each group of reactors connected to the analysis monitoring device are correspondingly provided with outlet flow valves.

Further, a gap between the main reaction chamber and a simulated core is filled with an inert temperature-resistant material.

According to an embodiment of the present invention, a surface of the reactor is sleeved with a thermal insulation layer, the reactor is further provided with a heating device with a temperature monitoring function for controlling the temperature inside the reactor, and the reactors are all arranged inside a thermostatic chamber.

According to an embodiment of the present invention, confining pressure pumps are further provided outside the reactor and separately connected to the confining pressure connectors of each group of reactors.

According to an embodiment of the present invention, a back-pressure valve is provided on a pipeline of the analysis monitoring device connected to each group of reactors, and a cooling dryer is provided on a pipeline between the analysis monitoring device and the back-pressure valve.

According to an embodiment of the present invention, the displacement pump, the flow stabilizing valve and the one-way valve that are connected to the water vapor generator are integrally arranged inside a thermal insulation box.

In addition, the present invention further provides a use method of the experimental simulation device for hydrogen production by in-situ conversion of the gas reservoir for simulating the process of the hydrogen production of a multi-stage fracturing horizontal well in a shale reservoir and a shale gas reservoir, which mainly comprises the following steps:

step A1: assembling experimental equipment, placing simulated shale cores into main reaction chambers of all reactors, and then injecting helium into the whole experimental equipment to remove impurities;

step A2: controlling a confining pressure and a temperature of any one selected reactor to conditions required by the experiment, simulating actual conditions of the reservoir, and controlling the rest reactors to keep a closed state;

step A3: preheating methane, water vapor and oxygen separately, after preheating to a reaction temperature required by the experiment, firstly injecting methane into the selected reactor in the step A2 to a pressure higher than a partial pressure required by the experiment, then controlling the interaction pipeline to communicate other reactors with the methane-injected reactor, and then injecting water vapor and oxygen into the reactor to perform hydrogen production reaction;

step A4: monitoring the reaction in the methane-injected reactor online by the analysis monitoring device, collecting pressure changes in all reactors, and keeping the reaction stable until the reaction is completed when the analysis monitoring device judges that the conversion rate of methane in the generated gas produced in the selected reactor in the step A2 is stable and unchanged; and step A5: controlling other reactors to repeat the steps A2 to A4 based on experimental requirements, and collecting the final conversion data of methane in the reactor participating in the reaction and the pressure changes in all other reactors during the reaction process.

In another aspect, the present invention further provides a use method of the experimental simulation device for hydrogen production by in-situ conversion of the gas reservoir for simulating gas source supplement by gas well displacement during the multi-well cooperative hydrogen production of a sandstone reservoir, which mainly comprises the following steps:

step B1: assembling experimental equipment, placing simulated sandstone cores into main reaction chambers of all reactors, and then injecting helium into the whole experimental equipment to remove impurities;

step B2: controlling the confining pressure and the temperature of all reactors to conditions required by the experiment, simulating the actual conditions of the reservoir, selecting any one of the reactors as a place for hydrogen production reaction, and keeping the interaction pipeline between the other reactors and the selected reactor separated;

step B3: preheating methane, water vapor and oxygen separately, after preheating to a reaction temperature required by the experiment, separately injecting the methane, the water vapor and the oxygen into the selected reactor in the step B2 to the partial pressure required by the experiment, and performing hydrogen production reaction;

step B4: injecting methane into the rest reactors, communicating an interaction pipeline between the rest reactors injected with methane and the reactor selected in the step B2 when the analysis monitoring device judges that the conversion rate of methane in the generated gas produced in the reactor selected in the step B2 is stable and unchanged, injecting helium into the rest reactors, and displacing the methane in the rest reactors into the reactor selected in the step B2 for reaction; and step B5: separately collecting and monitoring the generated gas discharged from the reactor selected in the step B2 by using the analysis monitoring device, judging a ratio of the methane in the generated gas by using the analysis monitoring device, supplementing water vapor and oxygen into the reactor selected in the step B2 until the conversion rate of the methane in the discharged generated gas is stable and unchanged, and collecting the final conversion rate data of methane in the reactor selected in the step B2 in the whole process and the temperature and pressure changes in all reactors during the reaction process.

The present invention has the technical effects as follows.

1. The hydrogen production simulation is performed in the form of a plurality of groups of reactors connected to each other, and the process of the hydrogen production of a multi-stage fracturing horizontal well in a shale gas reservoir in actual production can be effectively simulated, so that the experimental result is closer to the actual production, and the accuracy of the simulation experiment is improved.

2. The in-situ hydrogen production from the gas reservoir in the sandstone formation with a higher porosity can be simulated, the process of gas source supplement by gas well displacement during the multi-well cooperative hydrogen production of a sandstone reservoir is effectively reflected, and experimental data guidance is provided for the actual production process.

3. The reactor in the present invention comprises a pre-reaction chamber, which can convert a part of hydrocarbons before the hydrocarbons enter a converter, reducing the load of the subsequent main reaction chamber, so that the reaction can be performed more fully; and meanwhile, the pre-reaction chamber can also simulate the underground wellbore and near-wellbore high-permeability zone in actual production, so that the experimental result is closer to the actual production.

BRIEF DESCRIPTION OF DRAWINGS

To describe the technical solutions in embodiments of the present invention more clearly, the following briefly describes the accompanying drawings used for describing embodiments. It should be understood that the accompanying drawings show only some embodiments of the present invention, and therefore should not be considered as a limitation on the scope. Those of ordinary skill in the art may still derive other related drawings from these accompanying drawings without creative efforts.

Figure 1:
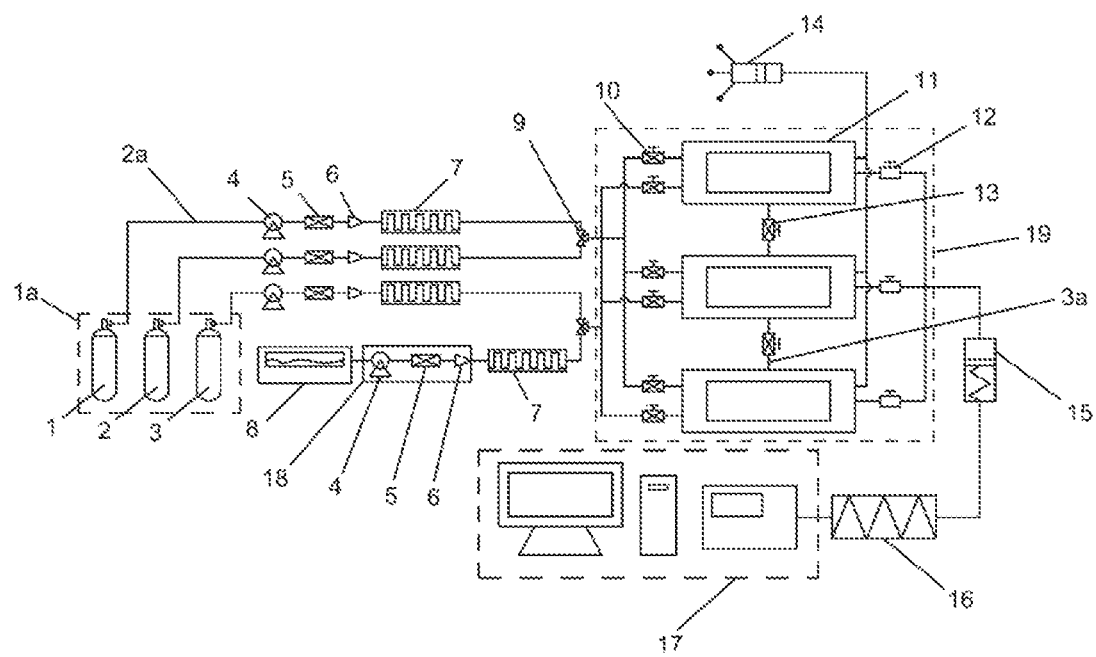
FIG. 1 is a schematic diagram of an overall structure of the present invention.

In the drawings, 1: methane tank, 2: helium tank, 3: oxygen tank, 4: displacement pump, 5: flow stabilizing valve, 6: one-way valve, 7: heater, 8: water vapor generator, 9: three-way valve, 10: inlet flow valve, 11: reactor, 12: outlet flow valve, 13: communicating valve, 14: confining pressure pump, 15: back-pressure valve, 16: cooling dryer, 17: analysis monitoring device, 18: thermal insulation box, 19: thermostatic chamber, 1101: main reaction chamber, 1102: pre-reaction chamber, 1103: inlet connector, 1104: relay connector, 1105: heating device, 1106: simulated core, 1107: clamping assembly, 1108: outlet connector, 1109: communicating pipe connector, 1110: confining pressure connector, 1111: thermal insulation layer, 1112: inert temperature-resistant material, 1a: gas source, 2a: connecting pipeline, and 3a: interactive pipeline.

DETAILED DESCRIPTION OF EMBODIMENTS

The present invention is further described in detail below with reference to the embodiments and drawings.

To make objectives, technical solutions, and advantages of embodiments of the present invention clearer, the following clearly and completely describes the technical solutions in embodiments of the present invention with reference to the accompanying drawings in embodiments of the present invention. It is clear that the described embodiments are some but not all of embodiments of the present invention. Based on the embodiments of the present invention, all other embodiments obtained by those of ordinary skill in the art without creative effort shall fall within the protection scope of the present invention. Therefore, the following detailed descriptions of embodiments of the present invention provided in the accompanying drawings are not intended to limit the scope of the present invention that claims protection, but merely to represent selected embodiments of the present invention.

Embodiment

Referring to FIG. 1, an experimental simulation device for hydrogen production by in-situ conversion of a gas reservoir comprises a gas source 1a, reactors 11 and an analysis monitoring device 17, wherein the gas source 1a comprises a methane tank 1, a helium tank 2, an oxygen tank 3 and a water vapor generator 8, and methane is used to simulate shale gas stored in a formation. In the experimental equipment, nitrogen is generally used for protection and impurity removal, however, the nitrogen is easily converted into ammonia gas under the conditions of the equipment; therefore, the helium is used for protection and impurity removal, oxygen and water vapor are used to simulate a gasification agent for reaction, the methane tank 1, the helium tank 2, the oxygen tank 3 and the water vapor generator 8 are separately connected into a plurality of groups of reactors 11, and a displacement pump 4, a flow stabilizing valve 5, a one-way valve 6 and a heater 7 are sequentially arranged on a connecting pipeline 2a between a gas source 1a and the reactor 11, so that each group of gases can be heated to the experimental temperature with a stable gas flow before entering the reactor 11, and gas backflow can be avoided.

Figure 2:
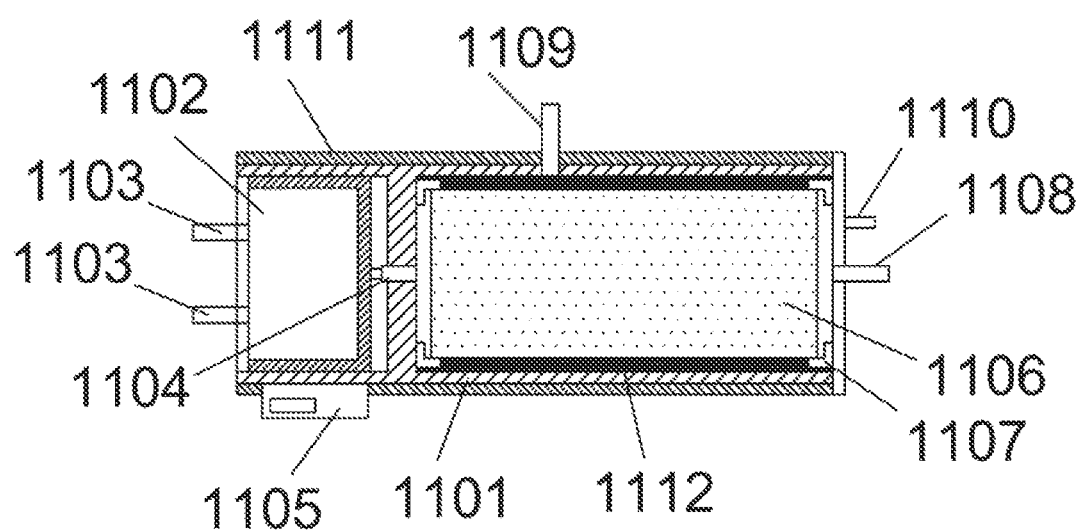
FIG. 2 is a schematic diagram of a structure of a reactor according to the present invention.

Referring to FIG. 2, the reactor 11 comprises a main reaction chamber 1101 and a pre-reaction chamber 1102, wherein the main reaction chamber 1101 is a sealed cavity structure positioned inside the reactor 11, the pre-reaction chamber 1102 is a detachable cavity arranged inside the reactor 11, and the main reaction chamber and the pre-reaction chamber are connected through a relay connector 1104; the reactor 11 is provided with an inlet connector 1103 for connecting a gas source pipeline, the inlet connector 1103 can be connected into the pre-reaction chamber 1102, and the reactor 11 is further provided with an outlet connector 1108 connected to the main reaction chamber 1101 for discharging gas; and the main reaction chamber 1101 of the reactor 11 is provided with at least two groups of communicating pipe connectors 1109 and a group of confining pressure connectors 1110 connected to an external confining pressure device. It can be seen that the main reaction chamber 1101 is a main container for placing a simulated core 1106, the gas entering the reactor 11 from the inlet connector 1103 needs to enter the pre-reaction chamber 1102 first, and the gas performs preliminary pre-reaction in the pre-reaction chamber 1102, and the reaction degree is relatively limited; in one aspect, the phenomenon that the gas entering the main reaction chamber 1101 is too high in concentration to cause violent reaction or incomplete reaction can be avoided, and in another aspect, a wellbore and a high permeability zone part through which the gas needs to pass in the actual production gas injection process can be simulated, so that the result is closer to the actual production. In addition, in some embodiments where the gas is not high in concentration, the pre-reaction chamber 1102 may be removed from the reactor 11, and the inlet connector 1103 is directly connected to the relay connector 1104 through an additional hose or the like, so that the gas directly enters the main reaction chamber 1101 for reaction, which in turn increases the concentration of the reaction gas and further increases the reaction rate. The in-situ hydrogen production reaction in the reactor 11 may be directly performed under the corresponding temperature and pressure conditions. In some embodiments, a catalyst may be provided inside the main reaction chamber 1101 or in a fracture of the simulated core 1106 to simulate the in-situ hydrogen production reaction in the presence of the catalyst.

The adjacent reactors 11 are also connected by an interaction pipeline 3a, and the interaction pipeline 3a is provided with a communicating valve 13 that is connected to a communicating pipe connector 1109 of the adjacent reactors 11; each group of reactors 11 can be regarded as a well section for in-situ hydrogen production in a group of formations, the interactive pipelines 3a between the reactors 11 can be regarded as connecting sections between the well sections, and in the in-situ hydrogen production process in the device, the interactive pipelines 3a can be used to transfer pressure and guide gas flow, so that the simulation of the process of hydrogen production of the multi-stage fracturing horizontal well and the process of supplementing the gas source 1a during the multi-well group cooperative hydrogen production is implemented, and the experiment is closer to the application conditions in actual production. The communicating pipe connectors 1109 on the reactors 11 can be connected based on a requirement, and the connection and disconnection states are controlled by the communicating valve 13, so as to achieve the purpose of selecting well section composition based on an experimental requirement. The communicating pipe connector 1109 without a connecting object can be blocked by adding a plug, which belongs to the common means in the prior art.

The analysis monitoring device 17 is connected to the outlet connectors 1108 of each group of reactors 11 separately, and the analysis monitoring device comprises common gas monitoring devices such as a gas chromatography, a computer and a flow meter that are used for the online monitoring of hydrogen and methane samples in the gas flow discharged by displacement in the reactor 11, so as to grasp the real-time in-situ hydrogen production state in the reactor 11, and the setting and monitoring mode thereof belongs to the conventional mode in the prior art. Meanwhile, after a temperature or pressure monitoring device is added to the analysis monitoring device 17, the temperature or pressure inside the reactor 11 can also be monitored separately, the monitoring mode of the pressure includes but is not limited to testing the whole pressure of a pipeline that is positioned between the inlet flow valve 10 and the outlet flow valve 12 and that is of the reactor 11 to measure the pressure inside the reactor 11, or setting a pressure probe to extend into the inside of the reactor to measure the pressure. In this embodiment, the measurement of the whole pressure of the pipeline is used for pressure measurement, the setting mode and steps thereof belong to the pressure monitoring technology in the prior art, and details are not described herein again. The temperature can be measured by setting a temperature probe to measure the internal temperature of the reactor 11.

The pipeline connecting the reactor 11 and the gas source 1a is provided with an inlet flow valve 10, and the inlet flow valve 10 can control the methane tank 1, the helium tank 2, the oxygen tank 3 and the water vapor generator 8 separately to input gas into the reactor 11. In some embodiments, the oxygen tank 3 and the water vapor generator 8 can be connected in parallel on a three-way valve 9 based on a requirement for being connected to the reactor 11 in a unified manner, so that the oxygen and the water vapor can be fully mixed when being input into the reactor 11. It can be seen that the gases that need to be fully mixed in pairs can play a role in promoting mixing by connecting the three-way valves 9 in parallel, the pipelines of the reactors 11 connected to the analysis monitoring device 17 are correspondingly provided with outlet flow valves 12, the delivery of the reactors 11 to the analysis monitoring device 17 can be controlled through the outlet flow valves 12. In some embodiments, a specific reactor 11 needs to be selected for in-situ hydrogen production, for example, in the process of simulating the in-situ hydrogen production of a multi-stage fracturing horizontal well, the reactors 11 need to be sequentially used to complete in-situ hydrogen production simulation, or the reactors 11 need to be randomly started to perform in-situ hydrogen production simulation; in the multi-well group cooperative hydrogen production, after the in-situ hydrogen production simulation is completed in any reactor 11, methane in the rest reactors 11 needs to be displaced to the reactors 11 for reaction, and in the above process, it is necessary to block the rest reactors 11, so that inlet flow valves 10 and outlet flow valves 12 are respectively arranged at the inlet and outlet parts of the reactors 11 for achieving the blockage for the specific reactor 11.

A clamping assembly 1107 is provided inside the main reaction chamber 1101 of the reactor 11 for clamping the simulated core 1106. To ensure the stability of the core inside the main reaction chamber 11, the clamping assembly 1107 is provided inside the reactor 11 for clamping the simulated core 1106. In some embodiments, the interior of the simulated core 1106 can be cut to prepare a fracture network structure before production, so as to be closer to the actual distribution of the core structure.

In the case of clamping the simulated core 1106, there is likely to be a gap between the simulated core 1106 and the main reaction chamber 1101. To eliminate the effect of dead volume, the gap may be densely filled with a corresponding inert temperature-resistant material 1112, and in some embodiments, a material such as activated carbon filament may be used for filling.

The reactor 11 is sleeved with a thermal insulation layer 1111, the reactor 11 is also provided with a heating device 1105 with a temperature monitoring function for controlling the temperature inside the reactor 11, the heating device 1105 and the thermal insulation layer 1111 are used to keep the temperature inside the reactor 11, so that the temperature can be maintained under experimental conditions. The heating device 1105 in this embodiment is preferably an electric heating device, the heating device with a temperature monitoring function is a conventional design in the prior art, and has the advantages of integrating heating and temperature measurement, which facilitates the volume reduction of the device. Meanwhile, a temperature monitoring component on the heating device 1105 can be configured to be connected to the temperature monitoring device in the analysis monitoring device 17, so as to achieve the temperature monitoring function of the analysis monitoring device 17 on the reactor 11, and the connection mode thereof belongs to the conventional design in the prior art. In addition, in some embodiments, to better stabilize the temperature of the reactor 11, the reactor 11 will be arranged inside a thermostatic chamber 19, where the thermostatic chamber 19 includes but is not limited to an oven, a constant temperature box, an infrared temperature control box and the like, and any device capable of achieving stable temperature control in the prior art can be used as the thermostatic chamber 19 in this embodiment. This is not particularly limited herein.

The outside of the reactor 11 is further provided with confining pressure valves 14 that are separately connected to the confining pressure connector 1110 of each group of reactors 11 and used to provide the confining pressure conditions required by the experiment for the reactors 11.

A back-pressure valve 15 is provided on a pipeline of the analysis monitoring device 17 connected to each group of reactors 11 and used to maintain the pressure inside the reactors 11 during the experiment.

A pipeline between the analysis monitoring device 17 and the back-pressure valve 15 is provided with a cooling dryer 16, and the gas needs to be cooled and dried before entering the analysis monitoring device 17 to avoid damage to the analysis monitoring equipment 17.

In some embodiments, the displacement pump 4, the flow stabilizing valve 5 and the one-way valve 6 connected to the water vapor generator 8 are integrally arranged inside the thermal insulation box 18, so that the water vapor generated in the water vapor generator 8 directly enters the thermal insulation box 18 and then enters the heater 7 in a gas form, and the whole process is performed under the specific temperature to avoid condensation of water vapor as much as possible, which will affect the full progress of the in-situ hydrogen production reaction.

This embodiment further provides a use method of the experimental simulation device for hydrogen production by in-situ conversion of the gas reservoir for simulating the process of the hydrogen production of a multi-stage fracturing horizontal well in a shale gas reservoir, and the use method is mainly used to simulate a multi-stage cooperative hydrogen production process of a shale horizontal well gas reservoir. In a shale formation, the compactness of a rock formation is high, a hydrogen production reaction belongs to a pressurization reaction, and in-situ hydrogen production operation is randomly performed on one group of fracturing well sections in a shale gas reservoir developed from a multi-stage fracturing horizontal well, which will inevitably have a greater impact on the reservoir pressure of adjacent gas reservoirs, thereby affecting the subsequent hydrogen production process of adjacent gas reservoirs. Therefore, an experimental equipment is used herein to simulate and investigate the mutual influence and the production effect of cooperative hydrogen production in adjacent well sections when the horizontal well is developed in the shale formation, and this use method specifically comprises the following steps:

Step A1: assembling experimental equipment, placing simulated shale cores into main reaction chambers of all reactors, and then injecting helium into the whole experimental equipment to remove impurities.

The porosity of the shale is low, and the gas can show large pressure changes when moving in the shale, so that when the core is arranged on the clamper, a natural core or a fracture-formed core after artificial fracture forming can be used based on a requirement.

Step A2: controlling a confining pressure and a temperature of any one selected reactor to conditions required by the experiment, simulating actual conditions of the reservoir, and controlling the rest reactors to keep a closed state.

The reactor can be selected randomly, specifically based on the requirements of the experiment, and the inlet flow valve, the outlet flow valve and the communication valves on the interaction pipelines are closed to achieve the closed state of the rest reactors.

Step A3: preheating methane, water vapor and oxygen separately, after preheating to a reaction temperature required by the experiment, firstly injecting methane into the selected reactor in the step A2 to a pressure higher than a partial pressure required by the experiment, then controlling the interaction pipeline to communicate other reactors with the methane-injected reactor, and then injecting water vapor and oxygen into the reactor to perform hydrogen production reaction.

In this step, the methane is filled into a core for simulating the distribution state of a certain section of shale gas in a horizontal well; in the subsequent steps, since a reactor used for hydrogen production reaction needs to be communicated with other reactors for testing, and a trend that partial methane is freely diffused to other reactors exists during communication, methane slightly higher than the partial pressure of experimental conditions is filled into the reactor selected in the step A2 for counteracting the trend of partial diffusion; and when the water vapor and oxygen are injected for formal reaction in the subsequent steps, the volume of the gas inside the selected reactor in the step A2 expands, so that the pressure is conducted to the adjacent reactor and gradually spreads to the rest reactors, and the influence on other reactors is generated, thereby simulating the influence on the adjacent shale segments during in-situ hydrogen production in shale.

Step A4: monitoring the reaction in the methane-injected reactor online by the analysis monitoring device, collecting pressure changes in all reactors, and keeping the reaction stable until the reaction is completed when the analysis monitoring device judges that the conversion rate of methane in the generated gas produced in the selected reactor in the step A2 is stable and unchanged.

In the arrangement of the foregoing devices, it can be seen that the analysis monitoring device can monitor the pressure inside the reactor in addition to the temperature, so that the analysis monitoring device can collect the pressure change inside the reactor selected in the step A2 and the rest reactors from the start of in-situ hydrogen production to the completion of the reaction.

Step A5: controlling other reactors to repeat the steps A2 to A4 based on experimental requirements, and collecting the final conversion data of methane in the reactor participating in the reaction and the temperature and pressure changes in all other reactors during the reaction process.

After the data of the reactors in the steps A1 to A4 are collected, other reactors in a closed state can be selected as new reactors to perform hydrogen production reaction, any connecting pipeline of the reactor where the hydrogen production reaction is performed at first can be kept unblocked in the process, and this reactor can also be closed and separated from the connection to the new reactor, which is specifically determined based on the experimental content. Meanwhile, the changes in data such as methane conversion rate and pressure of the related reactors in the process are collected, and the data of the reactors required by the experiment are collected by analogy, so that the simulation of the multi-stage hydrogen production process is achieved.

It should be noted that the treatment manner for the other reactors when the reactor is selected in the step A2 is not necessarily only to keep closed by closing the inlet flow valve and the outlet flow valve, a part of the reactors may be selected to be filled with methane based on the experimental requirements when the other reactors are closed, and the other part may be kept in a hollow state, and after the reaction inside the reactor selected in the step A2 is completed, the closed reactor filled with methane is selected as a new reactor to perform the hydrogen production reaction, so as to simulate and observe the influence of the hydrogen production reaction of the reaction section on the reaction section and the adjacent sections when a gas reservoir exists in the shale sections adjacent to the reaction section under the actual conditions.

The key of this use method is that in-situ hydrogen production reaction is performed in reactors representing different well sections sequentially. Since the phenomena of volume expansion, pressure increase and the like in the in-situ hydrogen production process in the actual formation, in this method, a plurality of well sections are communicated for implementing the in-situ hydrogen production, the influence of hydrogen production on adjacent fractured regions is judged through experiments, hydrogen production conversion reaction and rate between adjacent well sections are further obtained, the factors influencing hydrogen production efficiency under the plurality of well sections are explored, and accurate basis is provided for shale gas reservoir in-situ hydrogen production exploration under the actual formations.

In addition, this embodiment provides another use method of the experimental simulation device for hydrogen production by in-situ conversion of the gas reservoir for simulating gas source supplement by gas well displacement during the multi-well cooperative hydrogen production of a sandstone reservoir, and the use method is mainly used to simulate multi-well group cooperative hydrogen production and research the influence of gas source supplement operation by displacement on the hydrogen production state. The sandstone formation has a loose structure, and a large amount of gas is allowed to migrate in the sandstone formation. In the process of in-situ hydrogen production, the output of hydrogen production from a single well will gradually decrease after a certain period of time, to ensure the yield of a production well, a mode of displacing gas reservoirs stored in adjacent well sections into the production well can be used to ensure the continuous production of the output, the research aiming at this process can be performed by using the devices provided by the present invention, and this use method specifically comprises the following steps:

Step B1: assembling experimental equipment, placing simulated sandstone cores into main reaction chambers of all reactors, and then injecting helium into the whole experimental equipment to remove impurities.

The sandstone core can be directly produced by pressing, and fracture-forming is performed during the pressing process based on a requirement.

Step B2: controlling the confining pressure and the temperature of all reactors to conditions required by the experiment, simulating the actual conditions of the reservoir, selecting any one of the reactors as a place for hydrogen production reaction, and keeping the interaction pipeline between the other reactors and the selected reactor separated.

The purpose of isolating the interactive pipelines is to ensure that the selected reactor is independently used as a reaction site for hydrogen production reaction and is used to simulate in-situ hydrogen production under a single well.

Step B3: preheating methane, water vapor and oxygen separately, after preheating to a reaction temperature required by the experiment, separately injecting the methane, the water vapor and the oxygen into the selected reactor in the step B2 to the partial pressure required by the experiment, and performing hydrogen production reaction.

Step B4: injecting methane into the rest reactors, communicating an interaction pipeline between the rest reactors injected with methane and the reactor selected in the step B2 when the analysis monitoring device judges that the conversion rate of methane in the generated gas produced in the reactor selected in the step B2 is stable and unchanged, injecting helium into the rest reactors, and displacing the methane in the rest reactors into the reactor selected in the step B2 for reaction.

The methane is injected into the rest reactors to simulate the presence of gas reservoirs in the adjacent sandstone formation, the methane is displaced from the rest reactors into the reactor selected in the step B2 after the reaction in the reactor selected in the step B2 is completed, and the displacement of gas reservoirs in the adjacent sandstone formation into the production well for supplement is simulated. The displacement medium is generally an inert medium such as helium, where helium may be used for displacement.

Step B5: separately collecting and monitoring the generated gas discharged from the reactor selected in the step B2 by using the analysis monitoring device, judging a ratio of the methane in the generated gas by using the analysis monitoring device, supplementing water vapor and oxygen into the reactor selected in the step B2 until the conversion rate of the methane in the discharged generated gas is stable and unchanged, and collecting the final conversion rate data of methane in the reactor selected in the step B2 in the whole process and the pressure changes in all reactors during the reaction process.

The analysis monitoring device is used to measure and record the conversion rate of the methane originally filled into the reactor selected in the step B2 in the hydrogen production reaction and the pressure changes in the reactor, and simultaneously record the methane conversion rate and the pressure changes in the hydrogen production reaction in the reactor selected in the step B2 when the other reactors supplement and displace the methane in the subsequent step B4, so as to simulate supplementary gas reservoir displacement in the sandstone formation, thereby separately obtaining the efficiencies of the hydrogen production in the original well and by supplement and displacement and comparing the two hydrogen production modes.

The key of this use method is to investigate the distribution and changes in product compositions during the process of supplementing the displacement gas from adjacent well sections after the completion of in-situ hydrogen production in a single well, the output of the hydrogen production well is significantly reduced along with the consumption of underground methane gas in the actual production, and it can be seen that the operation mode of displacing the gas contained in the adjacent formation sections for supplementing the hydrogen production well has implementation value in consideration of the cost of uphole equipment and the cost of drilling a new well. Therefore, this device can play a role in observing the effect of hydrogen production supplemented by the displacement of the adjacent well, and this use method can be used to simulate the process of the hydrogen production of the gas source supplemented by the displacement of the adjacent well in the sandstone formation in actual production, can provide a theoretical experimental basis for researching the process of the adjacent well displacement, and further guides the optimization of the in-situ hydrogen production process in actual production.

In the description of the present invention, it should be noted that directions or positional relationships indicated by terms such as "upper", "lower", "front", "rear", "left", "right", "top", "bottom", "in", "out" are those shown based on the accompanying drawings, are merely intended to facilitate and simplify description rather than indicate or imply that the indicated device or element must have a specific direction and be structured and operated according to the specific direction, and should not be construed as limiting the present invention.

The above descriptions are merely preferred specific embodiments of the present invention, however, the protection scope of the present invention is not limited thereto, and any modifications and substitutions that can be easily conceived by those skilled in the art within the technical scope disclosed by embodiments of the present invention shall fall within the protection scope of the present invention. Therefore, the protection scope of the present invention shall be subject to the protection scope of the claims.

What is claimed is:

1. An experimental simulation device for hydrogen production by in-situ conversion of a gas reservoir, comprising: a gas source, a plurality of reactors for in-situ hydrogen production reaction and an analysis monitoring device, wherein the gas source comprises a methane tank, a helium tank, an oxygen tank and a water vapor generator, methane is used to simulate gas reservoir, the methane tank, the helium tank, the oxygen tank and the water vapor generator are separately connected into each reactor, and a displacement pump, a flow stabilizing valve, a one-way valve and a heater are sequentially arranged on a connecting pipeline between each tank of the gas source and the plurality of reactors;

each reactor comprises a main reaction chamber and a pre-reaction chamber, wherein the main reaction chamber is a sealed cavity structure positioned inside the reactor, the pre-reaction chamber is a detachable cavity arranged inside the reactor, and the main reaction chamber and the pre-reaction chamber are connected through a relay connector; each reactor is provided with an inlet connector for connecting a gas source pipeline, the inlet connector is detachable connected into the pre-reaction chamber, and each reactor is further provided with an outlet connector connected to the main reaction chamber for discharging gas; the main reaction chamber of each reactor is provided with at least two groups of communicating pipe connectors and a group of confining pressure connectors connected to an external confining pressure device;

the adjacent reactors are also connected by an interaction pipeline, and the interaction pipeline is provided with a communicating valve that is connected to a communicating pipe connector of the adjacent reactors; and the analysis monitoring device is connected to the outlet connector of each reactor, and can also be used to perform online monitoring on the temperature and pressure of the reactors.

2. The experimental simulation device for hydrogen production by in-situ conversion of the gas reservoir according to claim 1, wherein at least one group of inlet flow valves are provided on pipelines of each reactor connected to the gas source, the inlet flow valves can control the methane tank, the helium tank, the oxygen tank and the water vapor generator separately to input gas into the reactors, and the pipelines of each reactor connected to the analysis monitoring device are correspondingly provided with outlet flow valves.

3. The experimental simulation device for hydrogen production by in-situ conversion of the gas reservoir according to claim 1, wherein a clamping assembly is provided inside the main reaction chamber of each reactor for clamping the simulated core.

4. The experimental simulation device for hydrogen production by in-situ conversion of the gas reservoir according to claim 3, wherein a gap between the main reaction chamber and a simulated core is filled with an inert temperature-resistant material.

5. The experimental simulation device for hydrogen production by in-situ conversion of the gas reservoir according to claim 1, wherein a surface of each reactor is sleeved with a thermal insulation layer, each reactor is further provided with a heating device with a temperature monitoring function for controlling the temperature inside the reactor, and the reactors are all arranged inside a thermostatic chamber.

6. The experimental simulation device for hydrogen production by in-situ conversion of the gas reservoir according to claim 1, wherein a confining pressure pump serving as an external confining pressure device is arranged outside each reactor and is connected to the confining pressure connector of each reactor.

7. The experimental simulation device for hydrogen production by in-situ conversion of the gas reservoir according to claim 1, wherein a back-pressure valve is provided on a pipeline of the analysis monitoring device connected to each reactor, and a cooling dryer is provided on a pipeline between the analysis monitoring device and the back-pressure valve.

8. The experimental simulation device for hydrogen production by in-situ conversion of the gas reservoir according to claim 1, wherein the displacement pump, the flow stabilizing valve and the one-way valve that are connected to the water vapor generator are integrally arranged inside a thermal insulation box.

* * * * *